(12) United States Patent
Bansal et al.

(10) Patent No.: US 10,814,586 B2
(45) Date of Patent: Oct. 27, 2020

(54) DIRECT DEPOSITION OF NANOFIBER ON A TEXTILE SUBSTRATE

(71) Applicants: Vishal Bansal, Lee's Summit, MO (US); Martin Gregory Hatfield, Odessa, MO (US); Lei Li, Franklin, TN (US)

(72) Inventors: Vishal Bansal, Lee's Summit, MO (US); Martin Gregory Hatfield, Odessa, MO (US); Lei Li, Franklin, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/090,026

(22) PCT Filed: Mar. 30, 2017

(86) PCT No.: PCT/US2017/025101
§ 371 (c)(1),
(2) Date: Sep. 28, 2018

(87) PCT Pub. No.: WO2017/173124
PCT Pub. Date: Oct. 5, 2017

(65) Prior Publication Data
US 2019/0308390 A1    Oct. 10, 2019

Related U.S. Application Data

(60) Provisional application No. 62/315,536, filed on Mar. 30, 2016.

(51) Int. Cl.
*B32B 5/26* (2006.01)
*B32B 7/12* (2006.01)
(Continued)

(52) U.S. Cl.
CPC ............... *B32B 5/26* (2013.01); *B32B 5/024* (2013.01); *B32B 5/026* (2013.01); *B32B 5/08* (2013.01);
(Continued)

(58) Field of Classification Search
CPC ......... B32B 5/022; B32B 5/024; B32B 5/026; B32B 5/08; B32B 5/26; B32B 7/12;
(Continued)

(56) References Cited

U.S. PATENT DOCUMENTS 5,162,074 A    11/1992 Hills
6,037,281 A *  3/2000 Mathis .............. A61F 13/15203
                                                442/394
(Continued)

FOREIGN PATENT DOCUMENTS

CN    1241966 A      1/2000
JP    2010030289 A   2/2010
(Continued)

*Primary Examiner* — Michael A Tolin
(74) *Attorney, Agent, or Firm* — Reinhart Boerner Van Deuren P.C.

(57) ABSTRACT

A method of manufacturing a composite textile fabric is provided. The method includes the step of simultaneously forming and depositing fine fibers on a textile. The textile is at least one of a woven fabric, a knit fabric, and a fleece fabric. The fine fibers have an average diameter of less than 1.2 micron. The method also includes the step of bonding the fine fibers to form a membrane layer on the textile.

22 Claims, 5 Drawing Sheets

(51) Int. Cl.
*D01D 5/18* (2006.01)
*D04H 1/559* (2012.01)
*B32B 5/02* (2006.01)
*B32B 5/08* (2006.01)
*D01D 5/08* (2006.01)
*B32B 27/24* (2006.01)
*B32B 37/24* (2006.01)
*B32B 5/22* (2006.01)
*D04H 1/542* (2012.01)
*D04H 1/541* (2012.01)
*B32B 37/00* (2006.01)
*B32B 37/12* (2006.01)

(52) U.S. Cl.
CPC .................. *B32B 5/22* (2013.01); *B32B 7/12* (2013.01); *B32B 27/24* (2013.01); *B32B 37/0076* (2013.01); *B32B 37/24* (2013.01); *D01D 5/08* (2013.01); *D01D 5/18* (2013.01); *D04H 1/541* (2013.01); *D04H 1/542* (2013.01); *D04H 1/559* (2013.01); *B32B 2037/1215* (2013.01); *B32B 2250/02* (2013.01); *B32B 2250/03* (2013.01); *B32B 2250/20* (2013.01); *B32B 2255/02* (2013.01); *B32B 2255/26* (2013.01); *B32B 2255/28* (2013.01); *B32B 2305/18* (2013.01); *B32B 2305/24* (2013.01); *B32B 2307/50* (2013.01); *B32B 2307/546* (2013.01); *B32B 2307/724* (2013.01); *B32B 2307/7265* (2013.01); *B32B 2307/73* (2013.01); *B32B 2307/732* (2013.01); *B32B 2437/00* (2013.01); *B32B 2437/02* (2013.01)

(58) Field of Classification Search
CPC ........ B32B 37/0076; B32B 2037/1215; B32B 2307/724; B32B 2307/73; B32B 2437/00; D01D 5/08; D01D 5/098; D01D 5/18; D04H 1/54; D04H 1/541; D04H 1/542; D04H 1/559
See application file for complete search history.

(56) References Cited

U.S. PATENT DOCUMENTS

| | | | |
|---|---|---|---|
| 7,618,702 | B2 | 11/2009 | Frey et al. |
| 8,172,092 | B2 | 5/2012 | Green et al. |
| 8,647,540 | B2 | 2/2014 | Peno et al. |
| 8,647,541 | B2 | 2/2014 | Peno et al. |
| 8,679,285 | B2 * | 3/2014 | Erickson ................ B32B 5/022 156/291 |
| 8,709,309 | B2 | 4/2014 | Peno et al. |
| 8,778,240 | B2 | 7/2014 | Peno et al. |
| 9,181,635 | B2 | 11/2015 | Peno et al. |
| 2009/0266759 | A1 | 10/2009 | Green |
| 2010/0319113 | A1 * | 12/2010 | Rock ........................ A62D 5/00 2/457 |
| 2011/0114554 | A1 | 5/2011 | Li et al. |
| 2011/0210060 | A1 | 9/2011 | Green et al. |
| 2011/0223330 | A1 | 9/2011 | Green et al. |
| 2012/0294966 | A1 | 11/2012 | Peno et al. |
| 2012/0295021 | A1 | 11/2012 | Peno et al. |
| 2013/0004748 | A1 | 1/2013 | Heiskanen et al. |
| 2014/0035177 | A1 | 2/2014 | Lipton et al. |
| 2014/0035178 | A1 | 2/2014 | Kay et al. |
| 2014/0035179 | A1 | 2/2014 | Kay et al. |
| 2014/0042651 | A1 | 2/2014 | Kay et al. |
| 2014/0159262 | A1 | 6/2014 | Kay et al. |
| 2014/0217628 | A1 | 8/2014 | Peno et al. |
| 2014/0217629 | A1 | 8/2014 | Peno et al. |
| 2014/0339717 | A1 | 11/2014 | Peno et al. |
| 2015/0013141 | A1 | 1/2015 | Peno et al. |
| 2015/0024185 | A1 | 1/2015 | Labelle et al. |
| 2015/0070842 | A1 | 3/2015 | Lee et al. |
| 2015/0265746 | A1 | 9/2015 | Martin et al. |
| 2016/0016385 | A1 | 1/2016 | Nowak et al. |
| 2016/0069000 | A1 | 3/2016 | Kay et al. |
| 2016/0083867 | A1 | 3/2016 | Peno et al. |
| 2016/0288034 | A1 * | 10/2016 | Miyauchi ................ B32B 5/022 |

FOREIGN PATENT DOCUMENTS

| | | | |
|---|---|---|---|
| WO | WO 2011/106537 A2 | 9/2011 | |
| WO | WO-2015003170 A2 * | 1/2015 | .......... D04H 1/4382 |
| WO | WO 2015/046564 A1 | 4/2015 | |

* cited by examiner

DIRECT DEPOSITION OF NANOFIBER ON A TEXTILE SUBSTRATE

FIELD OF THE INVENTION

This invention generally relates to a method for producing a composite textile fabric having a textile layer and a membrane layer and more particularly to a method of simultaneously forming and depositing fine fibers on a textile layer and such that the fine fibers are bonded to produce a membrane layer.

BACKGROUND OF THE INVENTION

Methods of depositing fibers on to a substrate are known. Exemplary disclosures include US Publication Nos. 2011/0210060, 2011/0114554, and 2009/0266759; WIPO Publication No. WO 2011/106537; and U.S. Pat. Nos. 7,618,702 and 8,172,092. These entire disclosures are incorporated in their entireties herein by reference.

Furthermore, methods of and apparatuses for producing nanofibers are known by way of "forcespinning." Exemplary disclosures include U.S. Publication Nos. 2016/0083867, 2016/0069000, 2015/0013141, 2014/0339717, 2014/0217629, 2014/0217628, 2014/0159262, 2014/0042651, 2014/035179, 2014/0035178, 2014/0035177, 2012/0295021, and 2012/0294966 and U.S. Pat. Nos. 9,181,635; 8,778,240; 8,709,309; 8,647,541; and 8,647,540. These entire disclosures are incorporated in their entireties herein by reference. As such, forcespinning, spinnerets, materials, and methods disclosed in these references are preferred for use in an embodiment of the present invention that provides for improvements and new uses for such forcespinning systems.

BRIEF SUMMARY OF THE INVENTION

The inventive aspects and embodiments discussed below in the following separate paragraphs of the summary may be used independently or in combination with each other.

In one aspect, a method of manufacturing a composite textile fabric is provided. The method comprises a step of simultaneously forming and depositing fine fibers on a textile. The textile may be at least one of a woven fabric, a knit fabric, and a fleece fabric. Further, the fine fibers can have an average diameter of less than 1.2 micron. The method also comprises a step of bonding the fine fibers to form a membrane layer on the textile.

Additionally, the membrane layer of the composite textile fabric can provide the textile with a water resistance of at least 2.5 m W.C., measured by ISO 811.

Moreover, in some embodiments, the membrane layer provides the textile with a permeability of at least 0.2 CFM/ft2 at 0.5" W.C., measured by ASTM D737.

In other embodiments, the composite textile fabric has a drape of less than 5" (measured according to a cantilever stiffness test).

In such embodiments, the membrane layer preferably has an average pore size diameter of between 0.1 and 5 microns.

In certain embodiments, the fine fibers preferably have basis weight coverage of between 5 and 50 g/m$^2$.

In a still further embodiment, the method also can comprise the step of force-spinning the fine fibers by centrifugally expelling a liquid polymer through orifices in at least one spinneret while rotating the spinneret at a speed of at least 2500 rpms. The liquid polymer can include either a polymer melt, a polymer solution or both. The method can further comprise the step of drawing down a fiber diameter of the fine fibers through centrifugal force. Most preferably, the drawing down is accomplished in the absence of electrospinning forces.

In a further embodiment, the method includes an additional step of performing the method on a manufacturing line having a conveying mechanism adapted to convey a run of the textile through a plurality of stations. The stations include an unwind station having an unwinder with a replaceable roll of the textile. The stations also include a fine fiber deposition station with at least one spinneret, and a rewind station for taking up a roll of the composite textile fabric. The method also includes the step of conveying the textile from the unwind station through the deposition station to the rewind station in sequence.

Some manufacturing lines can further include a bonding station having at least one of a calendar roll and a heating oven. The bonding station, in such embodiments, is preferably downstream of the deposition station and upstream of the rewind station.

Other manufacturing lines can include a bonding agent deposition station for depositing or printing at least one of hot melt, adhesive and low melt component fibers. The bonding agent deposition station preferably is downstream of the unwind station and upstream of the fine fiber deposition station.

In preferred embodiments, the fine fiber is selected from the group consisting of thermoplastic polyurethane, polytetrafluoroethylene, polyvinylidene fluoride, and another fluoropolymer.

Nevertheless, the fine fiber can also be selected from the group consisting of a polyester, polyamide (such as polyamide 6 or polyamide 6,6), polyphenylene sulfide, polyolefins, fluoroelastomers, polyimide, and polyaramids.

In some embodiments, to enhance the water resistance, the composite textile fabric undergoes a hydrophobic treatment, oleophobic treatment, or both.

In another embodiment of the method of manufacturing a composite textile fabric in which binder fibers are simultaneously formed and deposited on a textile, the method also involves heating after deposition to facilitate sintering or melt-bond adhesion of the fine fibers to the textile.

The method of claim 15, wherein the binder fibers are multi-component fibers having a high melt component and a low-melt component, the high melt component having a melting temperature that is at least 10° C. higher than a melting temperature of the low-melt component.

In embodiments using binder fibers, preferably the binder fibers are selected from the group consisting of co-polyesters, co-polyamides, polyolefins, thermoplastic polyurethane, and fluorpolymers.

Additionally, the binder fibers are preferably a low-melt polymer having a melting temperature that is between 100 and 300° C.

Further, the binder fibers preferably have an average diameter of less than 10 microns.

In certain composite textile fabric, preferably, the fine fibers have a basis weight coverage of between 5 and 50 g/m$^2$, and the binder fibers have a basis weight coverage of between 4 and 40 g/m$^2$.

In some embodiments of the composite textile fabric, the fine fibers and the binder fibers form the membrane layer. Based on weight percentage, the fine fibers preferably comprise between 65% and 90% of the membrane layer, and the binder fibers preferably comprise between 10% and 35% of the membrane layer.

Preferably, the binder fibers are deposited onto the textile at least partially first before depositing the fine fibers. This can facilitate better attachment of the membrane layer to the textile.

In order to bond the fine fibers to the textile, the bonding step of the method can include a thermal bonding step in which the binder fiber is heated to at least partially melt or reach proximate a glass transition point to facilitate adherence.

The thermal bonding can be performed with an oven.

The thermal bonding step can also be performed using hot calendaring rolls.

In other aspects, the textile comprises multiple polymers including a high melt component and a low-melt component. In such embodiments, the high melt component preferably has a melting temperature that is at least 10° C. higher than a melting temperature of the low-melt component.

In still other aspects, the bonding step includes a thermal bonding step in which the low melt component is heated to at least partially melt or reach proximate a glass transition point to facilitate adherence.

As in prior embodiments, the thermal bonding can be performed with an oven.

Also as in prior embodiments, the thermal bonding step can be performed using hot calendaring rolls.

In certain embodiments, the method may also include the step of depositing adhesive or hot melt on the textile prior to the forming and depositing of fine fibers.

In such embodiments, said depositing of adhesive may be conducted using a first spinneret upstream of second spinneret that is simultaneously forming and depositing of fine fibers Also in such embodiments, the step of depositing adhesive can include forming adhesive attachment locations covering between 10% and 30% of a face of the textile, while leaving a remainder of the face of the textile free of adhesive to improve breathability in the textile fabric composite.

Depositing adhesive can be accomplished by printing between 2 and 20 g/m$^2$ of adhesive on the textile using Gravure rolls.

Preferably, the membrane layer of the composite textile fabric has a caliper thickness of between 0.001 and 0.01".

Prior to formation of the composite textile fabric, the textile preferably has the following properties: a caliper thickness of between 0.004 and 0.10"; a yarn size of between 10 and 500 denier; a moisture vapor transmission rating of at least 8,000 g/m2/d (measured according to ISO 15496); an air permeability of at least 2 CFM/ft$^2$ at 0.5" W.C. (measured according to ASTM D737); a launderability of at least 20 wash cycles; and a drape of 2" (measured according to a cantilever stiffness test).

After membrane deposition and bonding, the textile composite preferably has the following properties: a caliper thickness of between 0.005 and 0.110"; a moisture vapor transmission rating of at least 4,000 g/m2/d (measured according to ISO 15496); mean pore size between 0.1 and 5 micron; an air permeability of at least 0.05 CFM/ft$^2$ at 0.5" W.C. (measured according to ASTM D737); a launderability of at least 20 wash cycles; and a drape of at least 5" (measured according to a cantilever stiffness test).

Additionally, the textile composite further can further include a protective layer bonded to the membrane layer and the textile.

In some embodiments, the protective layer is a second textile, such as at least one of a woven fabric, a knit fabric, and a fleece fabric.

In embodiments of the manufacturing line, a second unwind station can be provided to carry a roll of a protective layer. The unwind station could be located downstream of the deposition station and upstream of the bonding station.

In an embodiment, the composite textile fabric is formed into at least one article of clothing.

In such embodiments, the membrane layer is preferably covered by at least one of a liner material, insulating batting, and/or a laminated protective layer.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1A:
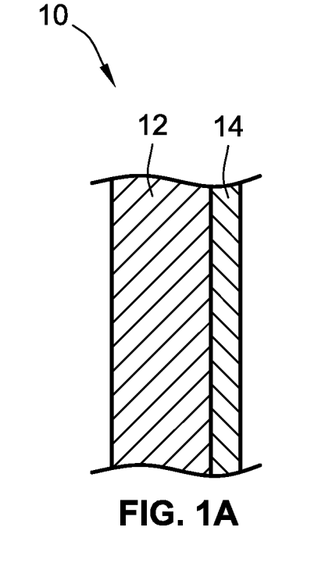
FIG. 1A is a schematic cross-sectional view (not to scale) of a composite textile fabric of the present invention.
Figure 1B:
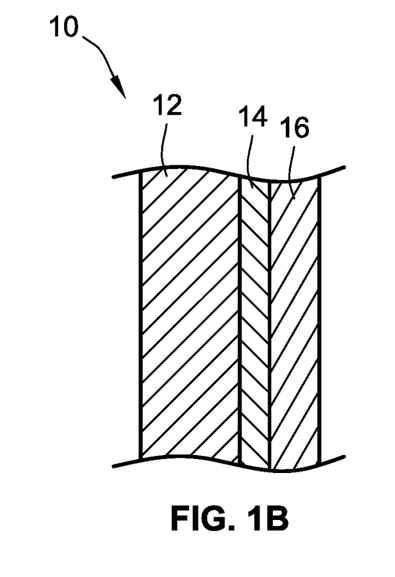
FIGS. 1B-D depict schematic cross sections (not to scale) of alternate embodiments of a composite textile fabric according to the present invention.

As shown in FIG. 1A, a composite textile fabric 10 is provided. The composite textile fabric 10 includes a first textile layer 12 and a membrane layer 14. As shown in FIG. 1B, in certain embodiments, the composite textile fabric 10 further includes a protective layer 16. However, the composite textile fabric 10 may be provided with only a single textile layer 12.

In preferred embodiments, the textile layer 12 is a textile fabric, i.e., the textile layer is designed for making into clothing, jackets, gloves, and other wearable items. Thus, the textile layer 12 is preferably a knit fabric, a fleece fabric, or a woven fabric.

Generally, the textile layer 12 will have the following properties prior to bonding with the membrane layer 14. The textile layer typically has a caliper thickness of between 0.004 and 0.10 inches. The textile will have a yarn size of between 10 and 500 d (denier). The moisture vapor transmission rating (MVTR) will be at least 8,000 g/m2/d (measured according to ISO 15496). The air permeability will be at least 2 CFM/ft2 at 0.5" W.C (inches water column) (measured according to ASTM D737). Additionally, the textile will be capable of 20 wash cycles (referred to hereinafter as "launderability"), and a drape of less than 2" (measured according to a cantilever stiffness test).

Figure 3:
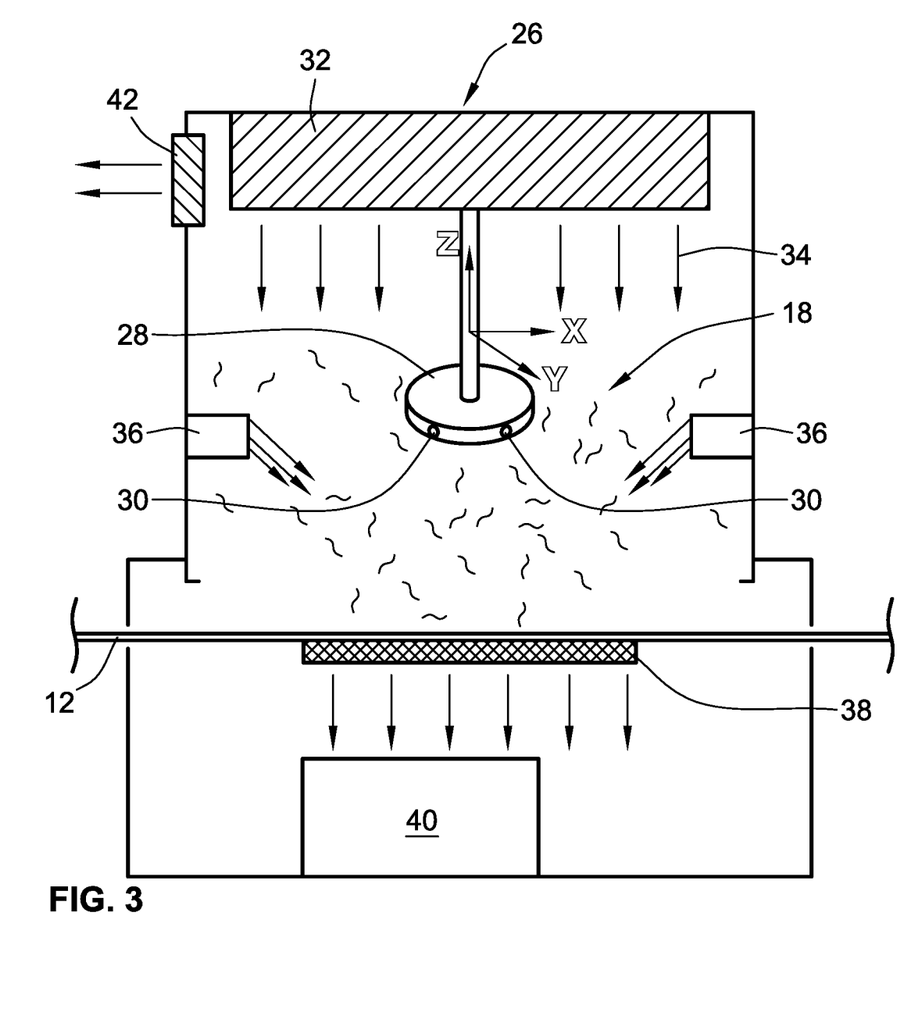
FIG. 3 depicts a spinneret for forcespinning of the nanofibers on the manufacturing line of FIG. 2.

The membrane layer 14 is preferably made from one or more fine fibers 18 (as depicted in FIG. 3) having an average diameter of less than 1.2 microns. "Fine fibers" as used herein may also be referred to as "performance fiber," meaning the fiber that is predominantly responsible for the desired performance of the membrane layer 14. Typically, the fine fibers 18 have a diameter between 250 and 750 nm. "Diameter" as used herein should not be read to imply that the fibers have a circular cross-section or that the fibers are substantially cylindrical in shape. Diameter measurements are performed by taking an scanning electron microscope (SEM) image of the fiber cross-section and measuring the distance across a typical section of the fiber. Stated another way, it is the fiber width as seen on an SEM image.

The membrane layer 14 is not formed separate from and later joined to the textile layer 12. Instead, fine fibers 18 of the membrane layer 14 are simultaneously formed and deposited on the textile layer 12. The fine fibers 18 are bonded to the textile layer 12 to form the composite textile fabric 10 such as with an adhesive or low-melt compound that can enable heat bonded attachment.

The composite textile fabric 10 preferably designed to be waterproof-breathable. In that regard, the combination of membrane layer 14 and fabric layer 12 produce a composite textile fabric 10 having a MVTR of at least 4,000 g/m$^2$/day, as measured by ISO 15496 (inverted cup method).

Preferably, the membrane layer 14 provides the composite textile fabric with a water resistance of at least 2.5 m W.C. (meters water column), measured by ISO 811. More preferably, the membrane layer provides the composite textile fabric with a water resistance of 5 m W.C., and most preferably, the water resistance is at least 10 m W.C. However, in certain embodiments, a water resistance of 20 m W.C. or more may be possible.

It should be noted that the water resistance may or may not be to the preferred level immediately after formation of the membrane layer 14 on the textile 12. In certain embodiments, the preferred level of water resistance is achieved after a hydrophobic treatment, oleophobic treatment, or both a hydrophobic and oleophobic treatment is performed on the composite textile fabric 10.

Further, in preferred embodiments, composite textile fabric 10 also has an air permeability of at least 0.05 CFM/ft$^2$ (cubic feet per minute per square foot) at 0.5" W.C. (inches water column), as measured by ASTM D737. In a more preferred embodiment, composite textile fabric 10 has an air permeability of at least 2 CFM/ft$^2$ at 0.5" W.C., and in a most preferred embodiment, the composite textile fabric has an air permeability of at least 3 CFM/ft$^2$ at 0.5" W.C.

Moreover, the membrane layer 14 preferably has an average pore size diameter of between 0.1 and 5 microns. The composite textile fabric 10 preferably has a launderability of at least 20 wash cycles. Additionally, for composite textile fabric 10 that is formed into garments or articles of clothing, the composite textile fabric has a drape of less than 5" (measured according to a cantilever stiffness test).

A variety of suitable fibers can be used to achieve or treated to achieve the aforedescribed properties. In a preferred embodiment, the fine fiber is a fluoropolymer, such as polytetrafluoroethylene or polyvinylidene fluoride. In another preferred embodiment, the fine fiber is thermoplastic polyurethane. Other suitable fibers include polyester, polyamide (such as polyamide 6 or polyamide 6,6), polyphenylene sulfide, polyolefins, fluoroelastomers, polyimide, and polyaramids.

In a preferred embodiment, fine fibers 18 are produced by a centrifugal spinning process (also known as "forcespinning"), such as disclosed in U.S. Pat. No. 8,647,540, the entire content of which is hereby incorporated by reference in its entirety. Forcespinning is most preferred and has been found to provide a nanofiber film having sufficient coverage, loft, and thickness to produce the porous structure necessary to achieve the desired MVTR, air permeability, porosity, pore size, launderability, and softness. Forcespinning does not expand the fibers under the power of a voltage differential, but merely uses centrifugal force to draw fibers down to size. Electrostatic force, if used, is merely for collection of fibers to guide deposition (a vacuum may also or alternatively be used) rather than drawing fiber size as in the case of electrospinning.

Figure 2:
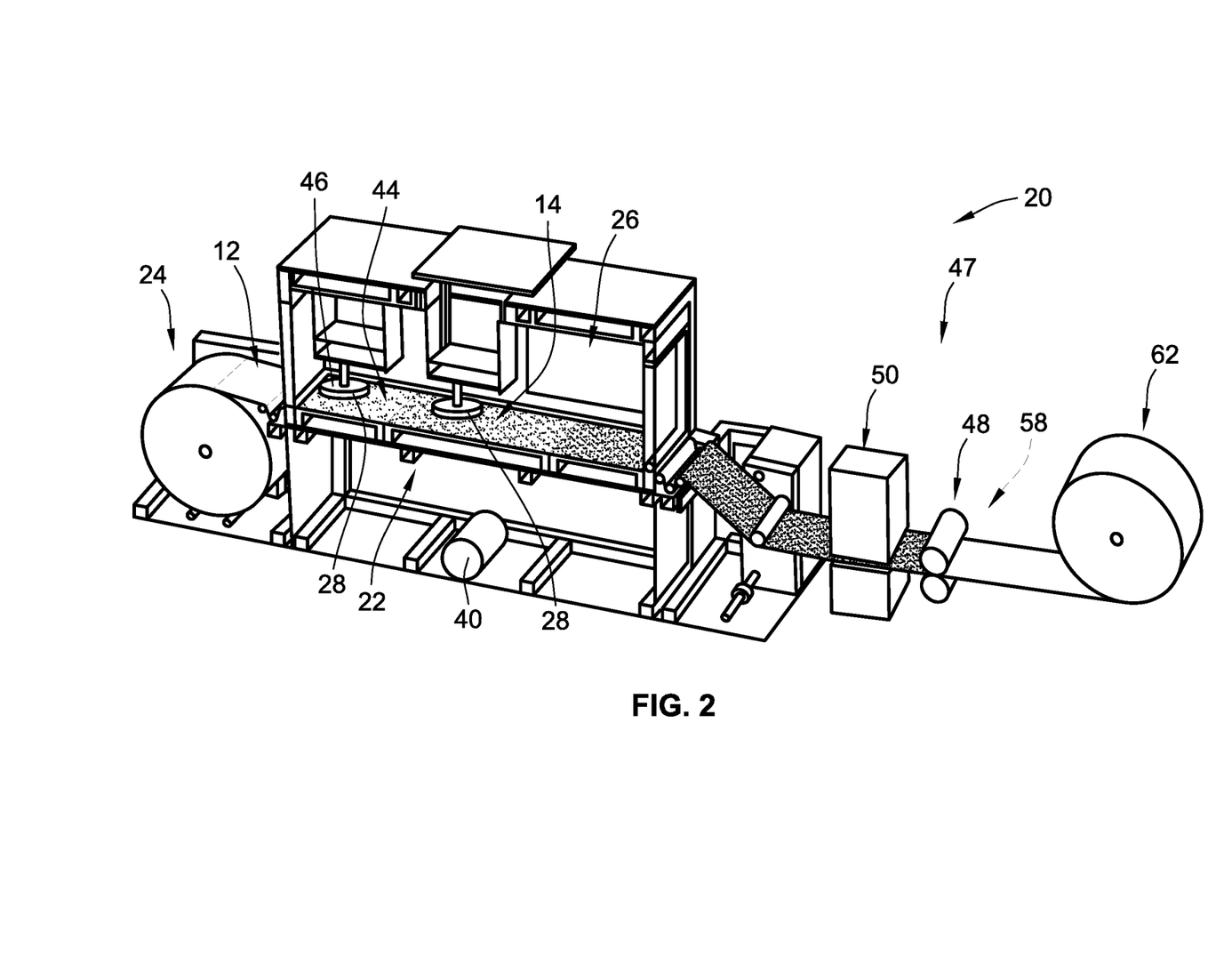
FIG. 2 is a partial isometric and schematic view depicting a manufacturing line having a conveying mechanism for creating the composite textile fabric of FIGS. 1A-C in which various stations described therein are optional.

A manufacturing line 20 suitable for forming and depositing fine fibers 18 via forcespinning on a textile layer 12 is depicted in FIG. 2. The manufacturing line 20 includes a conveying mechanism 22 including an unwind station 24 for the unwinding of the textile layer 12. The textile layer 12 is conveyed into the deposition station 26, which includes a spinneret 28 for producing the fine fibers 18. While the textile layer 12 is conveyed through the deposition station, a basis weight of between 5 and 50 g/m$^2$ (grams per square meter) of the fine fibers 18 are deposited on the textile layer 12. More typically, the basis weight of fine fibers 18 deposited will be between 10 and 25 g/m$^2$.

FIG. 3 depicts a more detailed schematic view of the deposition station 26. While the deposition station 26 of FIGS. 2 and 3 depict a single spinneret 28, more spinnerets 28 can be included in the deposition station 26 depending on the amount of fine fibers 18 needed and/or depending on the size of the textile layer 12 conveyed through the deposition station 26 and/or the speed at which the textile layer 12 is conveyed through the deposition station 26. For example, in a typical deposition station 26, a two meter wide textile layer 12 will have four spinnerets 28 arranged in a two-by-two fashion. However, the spinnerets 28 typically are capable of moving in the X, Y, and Z planes to provide a range of coverage options for the textile layer. Each spinneret 28 features a plurality of orifices 30 through which the fine fibers 18 are expelled. The orifices 30 can each be connected to the same reservoir of polymer melt, polymer solution, or liquid adhesive, each orifice 30 can be connected to a different reservoir of polymer melt, polymer solution, or liquid adhesive. Moreover, in embodiments with multiple spinnerets 28, each spinneret 28 can expel a different polymer melt, polymer solution, or liquid adhesive. During fine fiber deposition, the spinnerets 28 will rotate at least at 2500 rpms. More typically, the spinnerets 28 will rotate at least at 5000 rpms.

Several optional features of the deposition station 26 are depicted in FIG. 3. Generally, the fine fibers 18 are continuous fibers (though the fine fibers 18 are depicted schematically as short fibers in FIG. 3). The fine fibers 18 can be encouraged downwardly to collect on the textile layer 12 through a variety of mechanisms that can work independently or in conjunction with each other. For example, in some embodiments, a gas flow system 32 can be provided to induce a downward gas flow, depicted with arrows 34. The gas flow system 32 can also include lateral gas flow jets 36 that can be controlled to direct gas flow in different directions within the deposition station 26. Additionally, in some embodiments, formation of the fine fibers 18 will induce an electrostatic charge, either positive or negative, in the fiber. This electrostatic charge is not used to draw the fiber to the desired thickness as in electrospinning. Nevertheless, an electrostatic plate 38 can be used to attract the charged fibers 18 downwardly to the textile layer 12. Thus, as can be seen in FIG. 3, the electrostatic plate 38 is located below the moving textile layer 12. Furthermore, in some embodiments, a vacuum system 40 is provided at the bottom of the deposition station 26 to further encourage the fine fibers 18 to collect on the moving textile layer 12. Still further, in some embodiments, an outlet fan 42 is provided to evacuate any gasses that may develop, such as might develop as the result of solvent evaporation or material gasification, during the forcespinning process.

The fine fibers 18 are bound to the textile layer 12 and form the membrane layer 14. The fine fibers 18 can be bound to the textile layer 12 in a variety of ways.

In one embodiment, the fine fibers 18 are bound to the textile layer 12 using binder fibers 44. Generally, the binder fibers 44 have a lower melting temperature or a lower softening temperature than the fine fibers 18. Thus, the combination of the textile layer 12, fine fibers 18, and binder fibers 44 can be heated to the melting or softening temperature of the binder fibers 44 to bind the fine fibers 18 to the textile layer 12, which forms the membrane layer 14.

In a particular embodiment, the binder fibers 44 are deposited on the textile layer 12 prior to or at the same time as the fine fibers 18. Preferably, however, the binder fibers 44 are deposited first onto the textile layer 12, at least partially (e.g., the fibers may intermingle and/or overlap as a result of deposition), before depositing the fine fibers 18 so as to facilitate better attachment of the membrane layer 14 to the textile layer 12. The binder fibers 44 can be deposited in the same deposition station 26 as the fine fibers 18 or in a binder fiber 44 deposition station 46 downstream of the unwind station and upstream of the deposition station 26. In one embodiment in which the binder fibers 44 are deposited on the textile layer 12 in the same deposition station 26 as the fine fibers 18, the fibers are deposited by binder fiber spinnerets 28 upstream of fine fiber spinnerets 28. Sequences of binder fiber, fine fiber, binder fiber, and then fine fiber may be done in series with a series of four or more spinnerets.

In a specific embodiment, the binder fibers 44 are multi-component fibers having a high-melt component and a low-melt component. A method for forming a multi-component fiber is described, for example, in U.S. Pat. No. 5,162,074, the disclosure of which is incorporated herein in its entirety. In such embodiments, the high melt component has a melting temperature that is at least 10° C. higher than a melting temperature of the low-melt component.

In most embodiments, suitable binder fibers 44 include co-polyesters, co-polyamides, polyolefins, thermoplastic polyurethane, and fluorpolymers.

Preferably, the polymer or polymers selected to be the binder fibers 44 have a melting temperature that is between 100 and 300° C. Additionally, in certain embodiments, the binder fibers 44 have an average diameter of less than 10 microns. More typically, the binder fibers 44 will have an average diameter between 200 nm and 2,000 nm. Additionally, the binder fibers 44 will be deposited in an amount such that the binder fibers 44 will have a basis weight coverage of between 4 and 40 g/m$^2$.

Together the fine fibers 18 (i.e., the performance fibers) and the binder fibers 44 form the membrane layer 14 with the fine fibers 18, in an embodiment, comprising between 65 and 90 wt % of the membrane layer 14 and the binder fibers 44 comprising the remaining 10 to 35 wt % of the membrane layer 14. Accordingly, more performance fibers may make up the membrane layer 14.

Figure 4:
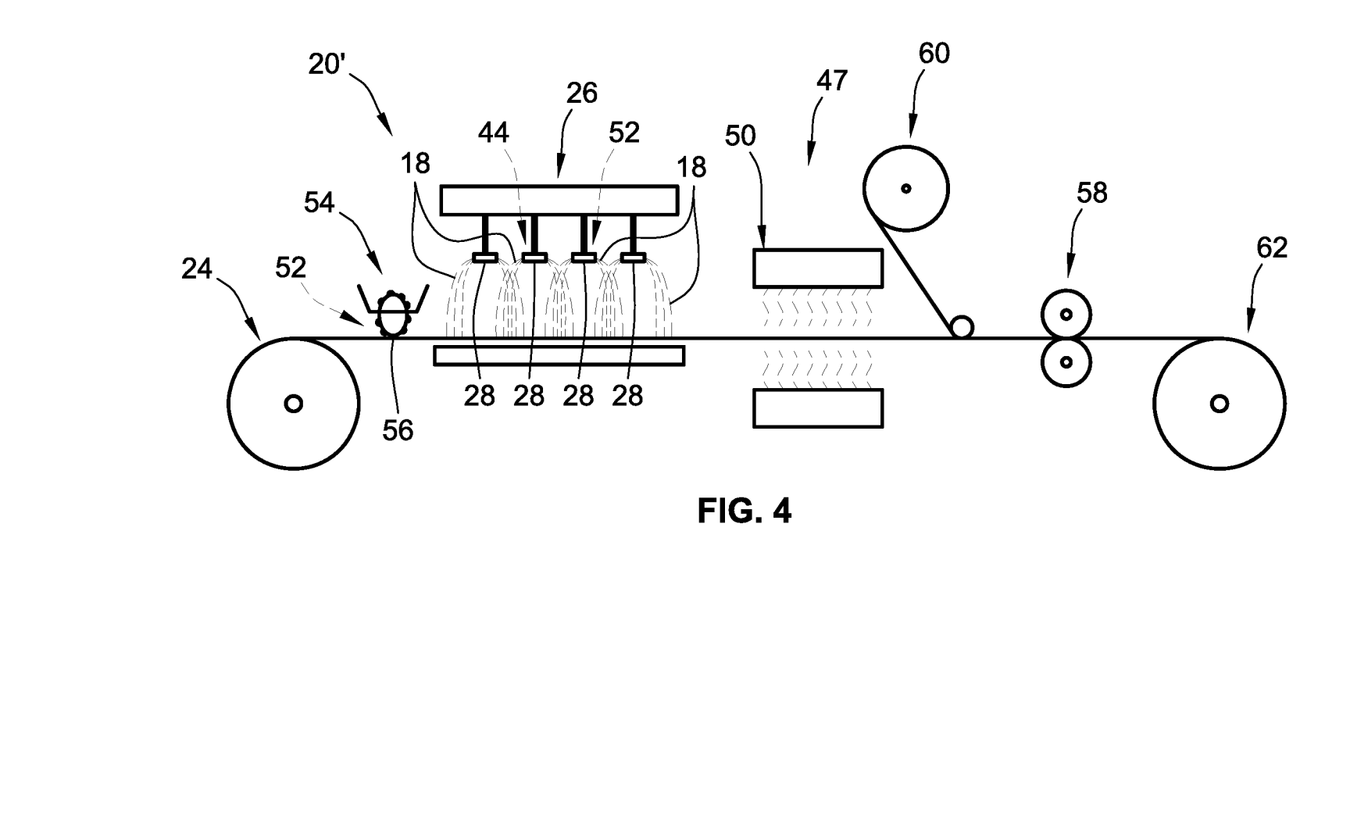
FIG. 4 is a side elevation schematic depicts another manufacturing line having a conveying mechanism for creating the composite textile fabric of FIGS. 1A-C in which various stations and devices shown along the line are optional.

After the binder fibers 44 and fine fibers 18 are deposited on the textile layer 12, a thermal bonding step is performed wherein the binder fibers 44 are heated to at least partially melt or proximately reach a glass transition point (i.e., a softening point) to facilitate adherence of the fine fibers 18 to the textile layer 12. In the embodiment depicted in FIG. 3, the thermal bonding step 47 is performed using a set of hot calendaring rolls 48. In other embodiments, more than one set of calendaring rolls (either heated or not heated) may be used. In another embodiment, the thermal bonding step 47 can be performed in an oven 50. Moreover, calendaring and/or hot calendaring can be performed in conjunction with an oven heating step as depicted in FIGS. 3 and 4.

In another embodiment, the fine fibers 18 are bound to the textile layer 12 using binder fibers that are woven into the textile layer 12. Thus, the binder fibers are already present on in the textile layer 12 when the textile layer 12 is loaded onto the unwinding station 24. Thus, the textile layer 12 is conveyed into the fine fiber deposition station 26, where the fine fibers 18 are deposited onto the textile layer 12. As in the previous embodiment, the textile layer 12 with the deposited fine fibers 18 is conveyed to a thermal bonding station 47 comprised of a combination of one or more sets of hot calendaring rolls and/or an oven. There the binder fibers are heated to a point where they at least partially melt or reach proximate a glass transition point to facilitate adherence.

In this embodiment, the binder fibers (low-melt component) have a lower melting or softening temperature than both the fine fibers and the other textile layer 12 fibers (high-melt components). Preferably, the hot-melt components have a melting or softening temperature that is at least 10° C. higher than a melting temperature of the low-melt component. In this embodiment, suitable binder fibers for weaving into the textile layer include co-polyesters, co-polyamides, polyolefins, thermoplastic polyurethane, and fluorpolymers.

Figure 1C:
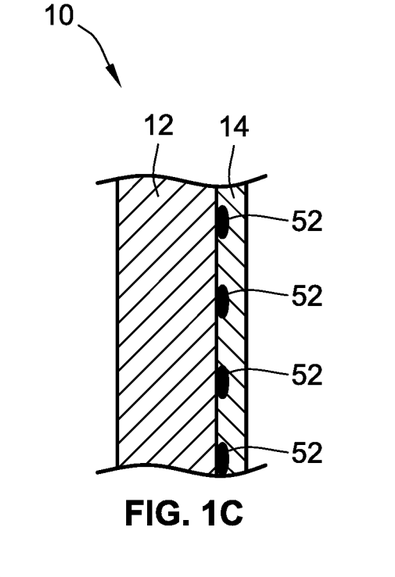

In still another embodiment, the fine fibers 18 are bonded to the textile layer 12 using a hot melt or an adhesive 52. FIG. 1C depicts a composite textile fabric 10 having with adhesive strips 52. In such an embodiment, a bonding agent deposition station 54 is provided upstream of the fine fiber deposition station 26 and downstream of the unwinding station 24. The hot melt can be any of a variety of suitable hot melts. Additionally, the adhesive can be a solid adhesive or a liquid adhesive, including water based and solvent based adhesives. Suitable hot melts and adhesives include polyurethane hot melt, acrylic emulsions, solvent borne polyurethane, polyolefin hot melt, and polyester hot melt.

In a specific configuration of this embodiment, the hot melt or adhesive is deposited using a first spinneret, such as first spinneret 46 in FIG. 3, upstream of a second spinneret 28 that is simultaneously forming and depositing the fine fibers. In another specific configuration, each spinneret deposits fine fiber and hot melt or adhesive simultaneously. Typically, the hot melt or adhesive will be deposited over between 10% and 30% of a face of the textile to provide attachment locations. The remainder of the face of the textile is left free of adhesive to improve breathability in the textile fabric composite 10.

In another specific configuration of this embodiment, the hot melt or adhesive is printed on the textile layer 12 at the bonding agent deposition station 54 using a Gravure roll 56 or screen-printing. As shown in FIG. 4, the Gravure roll 56 is position upstream of the fine fiber deposition station 26. Typically, the Gravure roll 56 will deposit between 2 and 20 g/m² of adhesive on the textile layer 12. More typically, the Gravure roll 56 will deposit between 6 and 15 g/m² of adhesive on the textile layer 12.

In embodiments using a hot melt or an adhesive, the hot melt or adhesive can be activated to bind the fine fibers 18 to the textile layer 12 in a variety of ways. For instance, the hot melt or adhesive 52 can be activated using the calendaring rolls 58, hot calendaring rolls 48, and/or oven 50. In other embodiments, the hot melt or adhesive can be activated using heat, ultraviolet light, visible light, moisture, or a combination of all of these.

In a further embodiment, the textile composite 10 further comprises a protective layer 16 bonded to the membrane layer 14 and the textile layer 12. The protective layer 16 can be another textile, such as a woven fabric, a knit fabric, and a fleece fabric. As depicted in FIG. 4, the protective layer is stored on a second unwind station 60 downstream of the deposition station 26 and upstream of the thermal bonding station 47. In this manner, the protective layer 16 can be laminated at the same time and using the same machinery as used to bond the fine fibers 18 to the textile layer 12. This may be used as an outermost surface of a clothing article to protect the membrane from detachment. If sufficient binder is used, the protective layer need not be applied and is, thus, considered optional. Additionally, the membrane layer can be arranged within a clothing article such that it is in a protected location.

In all the embodiments, the composite textile fabric 10, whether including the protective layer 16 or not, is taken up in a rewind station 62 at the most downstream end of the manufacturing line 20 depicted in FIG. 3 and manufacturing line 20' depicted in FIG. 4.

Figure 1D:
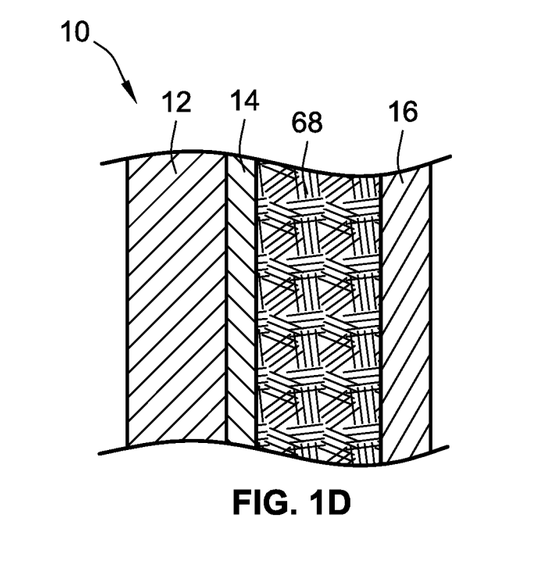
Figure 5:
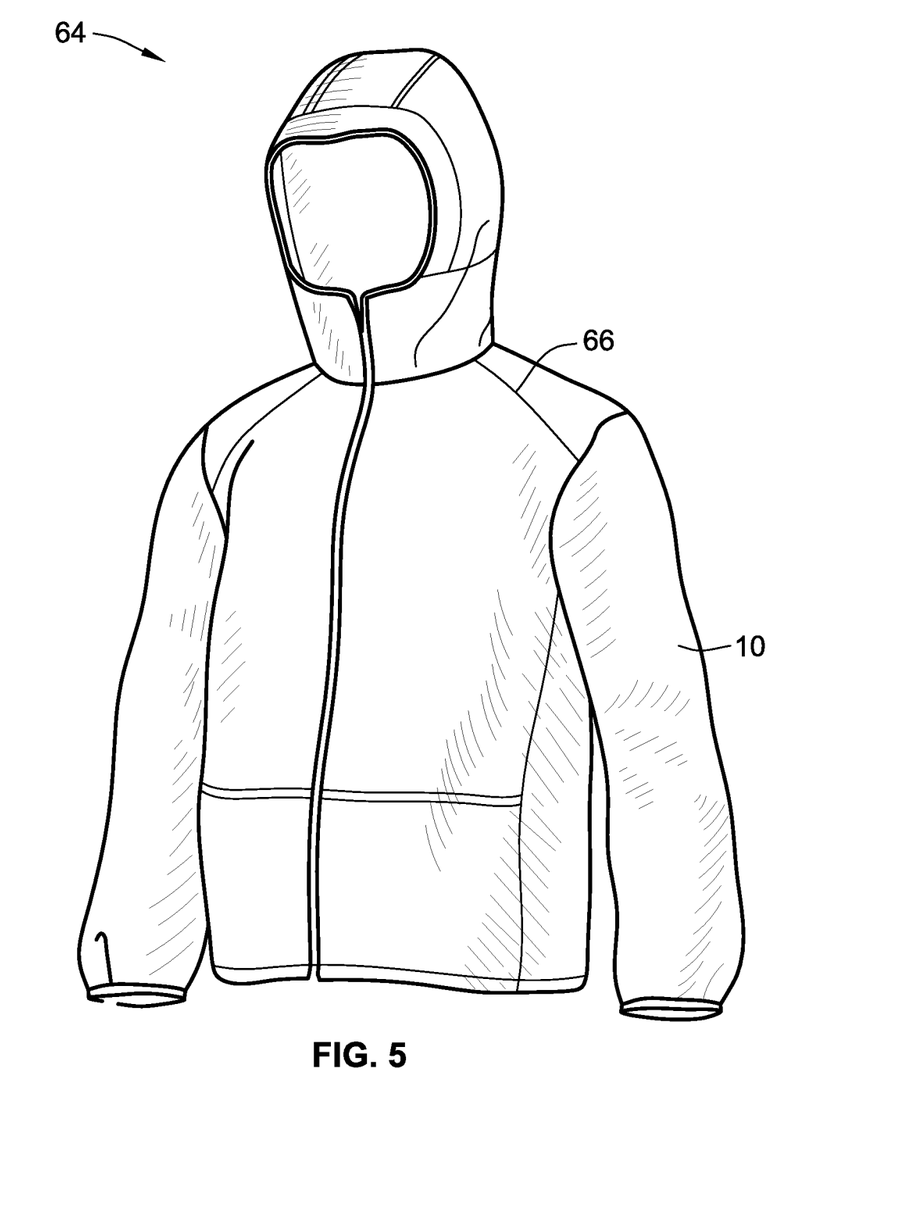
FIG. 5 depicts a garment incorporating the composite textile fabric of FIG. 1D.

Preferably, the composite textile fabric 10 is formed into a garment 64 or an article of clothing as shown in FIG. 5. Garments 64 such as ski jackets 66, gloves, windbreakers, and the like are envisioned to benefit from the composite textile fabric 10 made according to the presently invented method. As depicted in FIG. 1D, for jackets, gloves, and the like, the membrane layer 14 can be further protected with a liner material, insulating batting 68, and/or a laminated protective layer 16. For example, the nanofiber membrane may benefit from less binder and is typically, but not necessarily, free of a laminated protective layer 16 when the membrane is on an internal surface of the clothing article (see FIG. 1D).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing a composite textile fabric comprising a textile and a membrane layer, comprising:
    simultaneously forming fine fibers and depositing the fine fibers on the textile, the textile being one of a woven fabric, a knit fabric, or a fleece fabric, the fine fibers having an average diameter of less than 1.2 micron;
    simultaneously forming binder fibers and depositing the binder fibers on the textile; and
    bonding the fine fibers to the textile to form the membrane layer on the textile;
    wherein the step of bonding comprises heating the binder fibers after deposition of the binder fibers to facilitate the sintering or melt-bond adhesion of the fine fibers to the textile.

2. The method of claim 1, wherein the membrane layer provides the composite textile fabric with a water resistance of at least 2.5 m W.C. as measured by ISO 811.

3. The method of claim 1, wherein the composite textile fabric has a drape of less than 5 inches as measured according to a cantilever stiffness test.

4. The method of claim 1,
    wherein the step of simultaneously forming the fine fibers and depositing the fine fibers on the textile includes a step of force-spinning the fine fibers by centrifugally expelling a liquid polymer that comprises one of polymer melt or polymer solution, through orifices in at least one spinneret while rotating the at least one spinneret at a speed of at least 2500 rpms; and
    drawing down a fiber diameter of the fine fibers through centrifugal force and in the absence of electrospinning forces.

5. The method of claim 4, further comprising:
    performing a method of using a manufacturing line having a conveying mechanism to convey a run of the textile through a plurality of stations including:
        an unwind station comprising an unwinder having a replaceable roll of the textile,
        a fine fiber deposition station comprising the at least one spinneret; and
        a rewind station comprising a roll of the composite textile fabric; and
    conveying the textile from the unwind station through the fine fiber deposition station to the rewind station in sequence.

6. The method of claim 5, further comprising a step of heating the fine fibers at a bonding station comprising at least one of a calendar roll and a heating oven, wherein the bonding station is downstream of the fine fiber deposition station and upstream of the rewind station.

7. The method of claim 5, further comprising a step of depositing or printing, at a bonding agent deposition station, at least one of hot melt, adhesive and low melt component fibers, the bonding agent deposition station being downstream of the unwind station and upstream of the fine fiber deposition station.

8. The method of claim 1, wherein the fine fibers comprise a polymer selected from the group consisting of thermoplastic polyurethane, polytetrafluoroethylene, polyvinylidene fluoride, a fluoropolymer, a polyester, polyamide, polyphenylene sulfide, polyolefins, fluoroelastomers, polyimide, and polyaramids.

9. The method of claim 1, further comprising a step of providing the composite textile fabric with a hydrophobic treatment, an oleophobic treatment, or both.

10. The method of claim 1, wherein the binder fibers are multi-component fibers having a high-melt component selected from the group consisting of co-polyesters, co-polyamides, polyolefins, thermoplastic polyurethane, and fluoropolymers, and a low-melt component selected from the group consisting of co-polyesters, co-polyamides, polyolefins, thermoplastic polyurethane, and fluoropolymers, the high-melt component having a melting temperature that is at least 10° C. higher than a melting temperature of the low-melt component.

11. The method of claim 1, wherein the fine fibers and the binder fibers form the membrane layer, on weight percentage, the fine fibers comprising between 65% and 90% of the membrane layer and the binder fibers comprising between 10% and 35% of the membrane layer.

12. The method of claim 1, further comprising depositing at least some of the binder fibers onto the textile before depositing the fine fibers to facilitate the bonding of the fine fibers to the textile to form the membrane layer.

13. A method manufacturing a composite textile fabric comprising a textile and a membrane layer, comprising:
    simultaneously forming fine fibers and depositing the fine fibers on the textile, the textile being one of a woven fabric, a knit fabric, or a fleece fabric, the fine fibers having an average diameter of less than 1.2 micron; and
    bonding the fine fibers to the textile to form the membrane layer on the textile;
    wherein the composite textile fabric comprises multiple polymers including a high-melt component and a low-melt component, the high-melt component having a melting temperature that is at least 10° C. higher than a melting temperature of the low-melt component; and
    depositing adhesive or hot melt on the textile prior to the step of simultaneously forming the fine fibers and depositing the fine fibers.

14. The method of claim 13, wherein the bonding of the fine fibers to the textile comprises a thermal bonding step in which the low-melt component is heated to at least partially melt or reach proximate a glass transition point to facilitate adherence.

15. The method of claim 13, wherein the step of depositing adhesive or hot melt on the textile is conducted using a first spinneret, and the step of simultaneously forming the fine fibers and depositing the fine fibers is conducted using a second spinneret, wherein the second spinneret is downstream of the first spinneret.

16. The method of claim 13, wherein the step of depositing adhesive or hot melt on the textile comprises forming locations for adhesive attachment, the locations for adhesive attachment covering between 10% and 30% of a face of the textile, leaving a remainder of the face of the textile free of adhesive to improve breathability in the composite textile fabric.

17. The method of claim 13, wherein the step of depositing adhesive or hot melt on the textile comprises printing between 2 and 20 $g/m^2$ of adhesive on the textile using Gravure rolls.

18. The method of claim 13, wherein the membrane layer has a caliper thickness of between 0.001 and 0.01 inches.

19. The method of claim 13, wherein the textile has the following properties:
    a caliper thickness of between 0.004 and 0.10 inches;
    a yarn size of between 10 and 500 denier;
    a moisture vapor transmission rating of at least 8,000 $g/m^2/d$ as measured according to ISO 15496;
    an air permeability of at least 2 $CFM/ft^2$ at 0.5 inches W.C. as measured according to ASTM D737;
    a launderability of at least 20 wash cycles; and
    a drape of less than 2 inches as measured according to a cantilever stiffness test.

20. The method of claim 13, wherein the composite textile fabric, including the membrane layer, has the following properties:
    a caliper thickness of between 0.005 and 0.110 inches;
    a moisture vapor transmission rating of at least 4,000 $g/m^2/d$ as measured according to ISO 15496;
    a mean pore size of the membrane layer of between 0.1 and 5 microns;
    an air permeability of at least 0.05 $CFM/ft^2$ at 0.5 inches W.C. as measured according to ASTM D737;
    a launderability of at least 20 wash cycles; and
    a drape of less than 5 inches as measured according to a cantilever stiffness test.

21. The method of claim 13, wherein the composite textile fabric further comprises a protective layer bonded to the membrane layer, wherein the protective layer is a second textile, the second textile being one of a woven fabric, a knit fabric, and a fleece fabric, and wherein the method of manufacturing the composite textile fabric further comprises bonding the protective layer to the membrane layer.

22. A method of manufacturing at least one article of clothing, the method comprising the steps of:
    simultaneously forming fine fibers and depositing the fine fibers on a textile, the textile being one of a woven fabric, a knit fabric, or a fleece fabric, the fine fibers having an average diameter of less than 1.2 micron; and
    bonding the fine fibers to the textile to form a membrane layer on the textile, thereby forming a composite textile fabric comprising the textile and the membrane layer; and
    forming the composite textile fabric into the at least one article of clothing;
    wherein the composite textile fabric comprises multiple polymers including a high-melt component and a low-melt component, the high-melt component having a melting temperature that is at least 10° C. higher than a melting temperature of the low-melt component; and
    depositing adhesive or hot melt on the textile prior to the step of simultaneouslty forming the fine fibers and depositing the fine fibers.

* * * * *

UNITED STATES PATENT AND TRADEMARK OFFICE
CERTIFICATE OF CORRECTION

| | |
|---|---|
| PATENT NO. | : 10,814,586 B2 |
| APPLICATION NO. | : 16/090026 |
| DATED | : October 27, 2020 |
| INVENTOR(S) | : Vishal Bansal et al. |

Page 1 of 1

It is certified that error appears in the above-identified patent and that said Letters Patent is hereby corrected as shown below:

In the Claims

Claim 1, Line 1, delete "A method of manufacturing a composite textile fabric" and insert
-- A method of manufacturing a composite textile fabric, --

Claim 1, Line 13, delete "the sintering or melt-bond adhesion of the fine fibers to" and insert
-- sintering or melt-bond adhesion of the fine fibers to --

Claim 4, Line 2, delete "wherein the step of simultaneously forming the fine fibers" and insert
-- wherein the step of simultaneously forming fine fibers --

Claim 13, Line 1, delete "A method manufacturing a composite textile fabric" and insert -- A method
of manufacturing a composite textile fabric, --

Signed and Sealed this
Twenty-second Day of December, 2020

Andrei Iancu
*Director of the United States Patent and Trademark Office*